United States Patent
Jung et al.

(10) Patent No.: US 12,522,701 B2
(45) Date of Patent: Jan. 13, 2026

(54) POLYIMIDE FILM FOR GRAPHITE SHEET, MANUFACTURING METHOD THEREFOR, AND GRAPHITE SHEET MANUFACTURED THEREFROM

(71) Applicant: PI Advanced Materials Co., Ltd., Chungcheongbuk-do (KR)

(72) Inventors: Hyeong Seop Jung, Chungcheongbuk-do (KR); Dong Young Won, Chungcheongbuk-do (KR)

(73) Assignee: PI Advanced Materials Co., Ltd., Chungcheongbuk-do (KR)

( * ) Notice: Subject to any disclaimer, the term of this patent is extended or adjusted under 35 U.S.C. 154(b) by 868 days.

(21) Appl. No.: 17/775,057

(22) PCT Filed: Oct. 19, 2020

(86) PCT No.: PCT/KR2020/014236
§ 371 (c)(1),
(2) Date: May 6, 2022

(87) PCT Pub. No.: WO2021/091116
PCT Pub. Date: May 14, 2021

(65) Prior Publication Data
US 2022/0396676 A1   Dec. 15, 2022

(30) Foreign Application Priority Data

Nov. 8, 2019 (KR) .................. 10-2019-0142892

(51) Int. Cl.
*C08J 5/18* (2006.01)
*C01B 32/205* (2017.01)
*C08G 73/10* (2006.01)

(52) U.S. Cl.
CPC .............. *C08J 5/18* (2013.01); *C01B 32/205* (2017.08); *C08G 73/1021* (2013.01); *C08G 73/1032* (2013.01); *C08G 73/1067* (2013.01); *C01P 2006/32* (2013.01); *C08J 2379/08* (2013.01)

(58) Field of Classification Search
CPC ....... C08J 5/18; C08J 2379/08; C01B 32/205; C08G 73/1021; C08G 73/1032; C08G 73/1067; C08G 73/1003; C08G 73/105; C08G 73/1071; C08G 73/1042; C01P 2006/32; C04B 35/524; C04B 35/622; C04B 35/62218; C04B 2235/48; C04B 2235/9607; C08K 3/38; C08K 2003/385
See application file for complete search history.

(56) References Cited

U.S. PATENT DOCUMENTS

| | | | | |
|---|---|---|---|---|
| 4,520,075 A | * | 5/1985 | Igarashi | C08G 73/106 528/172 |
| 2015/0130098 A1 | * | 5/2015 | Hsiang | C08G 73/1071 528/340 |
| 2018/0127561 A1 | | 5/2018 | Wu et al. | |

FOREIGN PATENT DOCUMENTS

| | | |
|---|---|---|
| CN | 105255177 A | 1/2016 |
| JP | 2012-087047 A | 5/2012 |
| JP | 2015-093988 A | 5/2015 |
| JP | 2016-017169 A | 2/2016 |
| KR | 10-2015-0055525 A | 5/2015 |
| KR | 10-2016-0098832 A | 8/2015 |
| KR | 10-2015-0113472 A | 10/2015 |
| KR | 10-2019-0102560 A | 9/2019 |
| TW | 201609970 A | 3/2016 |
| TW | 201817676 A | 5/2018 |

OTHER PUBLICATIONS

International Search Report and Written Opinion from related PCT Application No. PCT/KR2020/014236, dated Oct. 28, 2020, 12 pages.

* cited by examiner

*Primary Examiner* — Daniel C. McCracken
(74) *Attorney, Agent, or Firm* — Brooks, Cameron & Huebsch, PLLC

(57) ABSTRACT

Disclosed herein are a polyimide film for graphite sheets, a method of fabricating the same, and a graphite sheet fabricated using the same. The polyimide film is fabricated by imidizing a polyamic acid formed by reaction between a dianhydride monomer and a diamine monomer, wherein the reaction is carried out in the presence of a metal compound and the polyamic acid forms a chelate with metal ions.

6 Claims, No Drawings

POLYIMIDE FILM FOR GRAPHITE SHEET, MANUFACTURING METHOD THEREFOR, AND GRAPHITE SHEET MANUFACTURED THEREFROM

TECHNICAL FIELD

The present invention relates to a polyimide film for graphite sheets, a method of fabricating the same, and a graphite sheet fabricated using the same. More particularly, the present invention relates to a polyimide film for graphite sheets, which can provide good thermal conductivity while reducing fabrication costs, a method of fabricating the same, and a graphite sheet fabricated using the same.

BACKGROUND ART

Recently, with reduction in weight, size, and thickness and improvement in integration degree, electronic devices suffer from increase in heat generation amount. Heat generated in electronic devices can cause failure, malfunction, and shortened lifespan of the electronic devices. Accordingly, thermal management for electronic devices is emerging as an important issue.

Graphite sheets have higher thermal conductivity than metal sheets, such as copper or aluminum, and are attracting attention as a heat dissipation member for electronic devices. Such a graphite sheet may be fabricated by various methods, for example, carbonization and graphitization of a polymer film. In particular, polyimide films are favored as a polymer film for graphite sheets due to good mechanical and thermal dimensional stability and chemical stability thereof.

It is known that the properties of a graphite sheet fabricated using a polyimide film depend on the properties of the polyimide film. Although various polyimide films for graphite sheets have been developed, there is still a need for a polyimide film that is adequate for fabrication of graphite sheets having further increased thermal conductivity.

Fabrication of a graphite sheet through graphitization of a polyimide film generally requires high temperatures of 2,800° C. or higher, which results in large power consumption and thus increase in fabrication costs. Therefore, there is a need for a polyimide film that can be graphitized at a lower temperature.

DISCLOSURE

Technical Problem

It is one object of the present invention to provide a polyimide film for graphite sheets, which can provide good thermal conductivity while reducing fabrication costs.

It is another object of the present invention to provide a method of fabricating the polyimide film set forth above.

It is a further object of the present invention to provide a graphite sheet fabricated using the polyimide film set forth above.

Technical Solution

1. In accordance with one aspect of the present invention, a polyimide film for graphite sheets is provided. The polyimide film is fabricated by imidizing a polyamic acid formed by reaction between a dianhydride monomer and a diamine monomer, wherein the reaction is carried out in the presence of a metal compound and the polyamic acid forms a chelate with metal ions.

2. In embodiment 1, a metal constituting the metal compound may include nickel, platinum, boron, aluminum, or a combination thereof.

3. In embodiment 1 or 2, the metal compound may include a metal oxide, a metal carbide, a metal nitride, or a combination thereof.

4. In any one of embodiments 1 to 3, the metal compound may include boron nitride.

5. In any one of embodiments 1 to 4, the metal compound may be present in an amount of about 0.05 wt % to about 1 wt % in the polyimide film based on the total weight of the polyimide film.

6. In any one of embodiments 1 to 5, the dianhydride monomer may include pyromellitic dianhydride, 3,3', 4,4'-biphenyltetracarboxylic dianhydride, or a combination thereof.

7. In any one of embodiments 1 to 6, the diamine monomer may include 4,4'-diaminodiphenylether, 4,4'-diaminodiphenylmethane, or a combination thereof.

8. In accordance with another aspect of the present invention, a polyimide film fabrication method is provided. The polyimide film fabrication method includes: preparing a polyamic acid solution chelated with metal ions by mixing an organic solvent with a dianhydride monomer, a diamine monomer, and a metal compound, followed by reaction; preparing a polyimide precursor composition by mixing the polyamic acid solution with a dehydrating agent and an imidizing agent; forming a gel film by casting the polyimide precursor composition onto a support, followed by drying; and forming a polyimide film through heat treatment of the gel film.

9. In embodiment 8, heat treatment of the gel film may be performed at a temperature of about 100° C. to about 700° C.

10. In accordance with a further aspect of the present invention, a graphite sheet is provided. The graphite sheet is fabricated using the polyimide film according to any one of embodiments 1 to 7 or using the polyimide film fabricated by the polyimide film fabrication method according to embodiment 8 or 9.

11. In embodiment 10, the graphite sheet may be fabricated by graphitizing the polyimide film at a temperature of less than 2,800° C.

12. In embodiment 10 or 11, the graphite sheet may have a thermal conductivity about 1.1 to 1.6 times that of a graphite sheet fabricated using a polyimide film free from the metal compound.

13. In any one of embodiments 10 to 12, the graphite sheet may have a thermal conductivity of about 1,300 W/m K or more.

Advantageous Effects

The present invention provides a polyimide film for graphite sheets, which can provide good thermal conductivity while reducing fabrication costs, a method of fabricating the same, and a graphite sheet fabricated using the same.

BEST MODE

Description of known functions and constructions which may unnecessarily obscure the subject matter of the present invention will be omitted.

It will be further understood that the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. As used herein, the singular forms "a", "an", and "the" are intended to include the plural forms as well, unless the context clearly indicates otherwise.

Further, a numerical value related to a certain component is construed to include a tolerance range in interpretation of components, unless clearly stated otherwise.

As used herein to represent a specific numerical range, the expression "a to b" means "≥a and ≤b".

Polyimide Film for Graphite Sheets

In accordance with one aspect of the present invention, a polyimide film for graphite sheets is provided. The polyimide film for graphite sheets is fabricated by imidizing a polyamic acid formed by reaction between a dianhydride monomer and a diamine monomer, wherein the reaction is carried out in the presence of a metal compound and the polyamic acid forms a chelate with metal ions. A polyimide film free from the metal compound has a compact linear polymeric layer structure, whereas the polyimide film fabricated in the presence of the metal compound has a bulky polymeric structure having increased entanglement and thus can be graphitized at lower temperatures. In addition, a graphite sheet fabricated using the polyimide film fabricated in the presence of the metal compound has increased thermal conductivity due to a synergistic thermal conduction effect of the metal component.

The metal compound may include any metal compound that can form a chelate with the polyamic acid.

In one embodiment, a metal constituting the metal compound may include nickel, platinum, boron, aluminum, or a combination thereof. For example, the metal may include boron, which is effective in increasing thermal conductivity and reducing the graphitization temperature of the polyimide film, without being limited thereto.

In one embodiment, the metal compound may include a metal oxide, a metal carbide, a metal nitride, or a combination thereof. For example, the metal compound may include a metal nitride, which is effective in increasing thermal conductivity and reducing the graphitization temperature of the polyimide film, without being limited thereto.

In one embodiment, the metal compound may include boron nitride, which can provide high in-plane thermal conductivity and good mechanical stability and heat resistance and is effective in graphitization of the polyimide film, without being limited thereto.

Although the amount of the metal compound is not particularly restricted, the metal compound may be present in an amount of, for example, about 0.05 wt % to about 1 wt % (for example, 0.05 wt %, 0.1 wt %, 0.15 wt %, 0.2 wt %, 0.25 wt %, 0.3 wt %, 0.35 wt %, 0.4 wt %, 0.45 wt %, 0.5 wt %, 0.55 wt %, 0.6 wt %, 0.65 wt %, 0.7 wt %, 0.75 wt %, 0.8 wt %, 0.85 wt %, 0.9 wt %, 0.95 wt %, or 1 wt %) in the polyimide film based on the total weight of the polyimide film. Within this range, the metal compound can provide increased thermal conductivity while reducing the graphitization temperature of the polyimide film. In one embodiment, the metal compound may be present in an amount of about 0.05 wt % to about 0.9 wt % in the polyimide film based on the total weight of the polyimide film and, in another embodiment, the metal compound may be present in an amount of about 0.05 wt % to about 0.8 wt % in the polyimide film based on the total weight of the polyimide film, without being limited thereto.

The dianhydride monomer may include any dianhydride monomer commonly used in the art. For example, the dianhydride monomer may include pyromellitic dianhydride, 3,3',4,4'-biphenyltetracarboxylic dianhydride, or a combination thereof, which is effective in increasing thermal conductivity and reducing the graphitization temperature of the polyimide film, without being limited thereto.

The diamine monomer may include any diamine monomer commonly used in the art without limitation. For example, the diamine monomer may include 4,4'-diaminodiphenylether, 4,4'-diaminodiphenylmethane, or a combination thereof, which is effective in increasing thermal conductivity and reducing the graphitization temperature of the polyimide film, without being limited thereto.

The thickness of the polyimide film is not particularly restricted. The polyimide film may have a thickness of, for example, about 30 µm to about 120 µm, as another example, about 30 µm to about 80 µm, as a further example, about 50 µm to about 80 µm, without being limited thereto.

The polyimide film for graphite sheets set forth above may be fabricated by any suitable method commonly used in the field of fabricating polyimide films. In one embodiment, the polyimide film may be fabricated by a method including: preparing a polyamic acid solution chelated with metal ions by mixing an organic solvent with a dianhydride monomer, a diamine monomer, and a metal compound, followed by reaction; preparing a polyimide precursor composition by mixing the polyamic acid solution with a dehydrating agent and an imidizing agent; forming a gel film by casting the polyimide precursor composition onto a support, followed by drying; and forming a polyimide film through heat treatment of the gel film.

First, the organic solvent is mixed with the dianhydride monomer, the diamine monomer, and the metal compound, followed by reaction, thereby preparing the polyamic acid solution chelated with metal ions. Since the dianhydride monomer, the diamine monomer, and the metal compound are the same as described above, detailed description thereof will be omitted.

The polyamic acid solution may be obtained by dissolving substantially equimolar amounts of the dianhydride monomer and the diamine monomer in the organic solvent along with the metal compound, followed by reaction. Depending on the type of monomers used as the dianhydride monomer and the diamine monomer and the desired properties of the polyimide film, the monomers may be added all at once or sequentially to a reactor. Partial polymerization between the monomers can occurs.

The organic solvent may include any organic solvent that can dissolve the polyamic acid, for example, an aprotic polar organic solvent. Examples of the aprotic polar organic solvents may include amide solvents, such as N,N'-dimethylformamide (DMF) and N,N'-dimethylacetamide (DMAC), phenolic solvents, such as p-chlorophenol and o-chlorophenol, N-methyl-pyrrolidone (NMP), γ-butyrolactone (GBL), and diglyme. These may be used alone or in combination thereof. As needed, an auxiliary solvent, such as toluene, tetrahydrofuran, acetone, methyl ethyl ketone, methanol, ethanol, or water, may be further used to adjust solubility of the polyamic acid. In one embodiment, the organic solvent may be an amide solvent, for example, N,N'-dimethylformamide or N,N'-dimethylacetamide, without being limited thereto.

Thereafter, the polyimide precursor composition may be prepared by mixing the polyamic acid solution with the dehydrating agent and the imidizing agent.

Here, the dehydrating agent refers to a substance that promotes ring closure of the polyamic acid through dehydration, and may include, for example, aliphatic acid anhydrides, aromatic acid anhydrides, N,N'-dialkylcarbodiimide, lower aliphatic halides, halogenated lower fatty acid anhydrides, aryl phosphonic dihalides, and thionyl halides. These may be used alone or as a mixture thereof. Thereamong, aliphatic acid anhydrides, such as acetic acid anhydride, propionic acid anhydride, and lactic acid anhydride, are preferred in view of availability and cost. These may be used alone or as a mixture thereof.

The imidizing agent refers to a substance that promotes ring closure of the polyamic acid, and may include, for example, aliphatic tertiary amines, aromatic tertiary amines, and heterocyclic tertiary amines. Thereamong, heterocyclic tertiary amines are preferred in view of catalytic reactivity. Examples of the heterocyclic tertiary amines may include quinoline, isoquinoline, β-picoline, and pyridine. These may be used alone or as a mixture thereof.

Although the amounts of the dehydrating agent and the imidizing agent are not particularly restricted, the dehydrating agent may be present in an amount of about 0.5 mol to about 5 mol (for example, 0.5 mol, 1 mol, 1.5 mol, 2 mol, 2.5 mol, 3 mol, 3.5 mol, 4 mol, 4.5 mol, or 5 mol), for example, about 1.0 mol to about 4 mol, per mol of an amic acid group in the polyamic acid and the imidizing agent may be present in an amount of about 0.05 mol to about 3 mol (for example, 0.05 mol, 0.1 mol, 0.5 mol, 1 mol, 1.5 mol, 2 mol, 2.5 mol, or 3 mol), for example, about 0.2 mol to about 2 mol, per mol of the amic acid group in the polyamic acid. Within these ranges, sufficient imidization can be achieved and the polyimide precursor composition can be easily cast in film form.

In one embodiment, the polyamic acid may be present in an amount of about 5 wt % to about 35 wt % (for example, 5 wt %, 10 wt %, 15 wt %, 20 wt %, 25 t %%, 30 wt %, or 35 wt %) based on the total weight of the polyimide precursor composition. Within this range, the precursor composition can have a suitable molecular weight and solution viscosity for forming a film. The polyamic acid may be present in an amount of, for example, about 10 wt % to about 30 wt %, as another example, about 15 wt % to about 20 wt %, based on the total weight of the precursor composition, without being limited thereto.

In one embodiment, the polyimide precursor composition may have a viscosity of about 100,000 cP to about 500,000 cP (for example, 100,000 cP, 150,000 cP, 200,000 cP, 250,000 cP, 300,000 cP, 350.000 cP, 400,000 cP, 450,000 cP, or 500,000 cP) at a temperature of 25° C. Within this range, the precursor composition can exhibit good processability during formation of the polyimide film while allowing the polyamic acid to have a predetermined weight average molecular weight. Here, the "viscosity" may be measured using a Brookfield viscometer. The polyimide precursor composition may have a viscosity of, for example, about 150,000 cP to about 450,000 cP, as another example, about 200,000 cP to about 400,000 cP, as a further example, about 250,000 cP to about 350,000 cP, at a temperature of 25° C., without being limited thereto.

In one embodiment, the polyamic acid may have a weight average molecular weight (Mw) of about 100,000 g/mol or more, for example, about 100.000 g/mol to about 500,000 g/mol (for example, 100,000 g/mol, 150,000 g/mol, 200,000 g/mol, 250,000 g/mol, 300,000 g/mol, 350,000 g/mol, 400,000 g/mol, 450,000 g/mol, or 500,000 g/mol), without being limited thereto. Within this range, a graphite sheet fabricated using the polyimide film can have further improved thermal conductivity. Here, the "weight average molecular weight" may be measured by gel permeation chromatography.

Thereafter, the gel film may be formed by casting the polyimide precursor composition on the support, followed by drying.

The support may include any support commonly used in the art. Examples of the support may include a glass plate, aluminum foil, an endless stainless belt, and a stainless drum.

Drying the polyimide precursor composition may be performed at a temperature of, for example, about 40° C. to about 300° C., as another example, about 80° C. to about 200° C., as a further example, about 100° C. to about 180° C., as yet another example, about 100° C. to about 130° C. Within this range, the dehydrating agent and the imidizing agent can be activated, whereby partial curing and/or drying of the cast precursor composition occurs, resulting in formation of the gel film. Herein, the "gel film" refers to a self-supported film intermediate which is formed in an intermediate stage of conversion of the polyamic acid into polyimide.

As needed, the method according to the present invention may further include stretching the gel film to adjust the thickness and size of a finally obtained polyimide film and to improve orientation of the polyimide film. Here, stretching of the gel film may be performed in at least one of the machine direction (MD) and the transverse direction (TD).

The gel film may have a volatile content of about 5 wt % to about 500 wt %, for example, about 5 wt % to about 200 wt %, as another example, about 5 wt % to about 150 wt %, without being limited thereto. Within this range, it is possible to avoid occurrence of defects, such as film breakage, uneven color tone, and characteristic variation, during subsequent heat treatment for obtaining the polyimide film. Here, the volatile content of the gel film may be calculated according to Equation 1. In Equation 1, A denotes an initial weight of the gel film and B denotes a weight of the gel film after heating the gel film to 450° C. for 20 minutes.

$$(A-B) \times 100/B \qquad \text{<Equation 1>}$$

Thereafter, the polyimide film may be formed through heat treatment of the gel film.

Heat treatment of the gel film may be performed at a variable temperature of, for example, about 100° C. to about 700° C., as another example, about 200° C. to about 600° C., as a further example, about 250° C. to about 550° C., for a period of, for example, about 0.05 to 0.4 hours, as another example, about 0.08 to 0.3 hours, as a further example, about 0.1 to 0.2 hours. Under these conditions, remaining solvent can be removed from the gel film and almost all remaining amic acid groups can be imidized, thereby obtaining the polyimide film.

As needed, the obtained polyimide film may be subjected to heat-finishing treatment at a temperature of about 400° C. and about 650° C. for about 5 to 400 seconds to be further cured. Here, the heat-finishing treatment may be performed under a predetermined tension to relieve any remaining stress from the obtained polyimide film.

Graphite Sheet

In accordance with another aspect of the present invention, there is provided a graphite sheet fabricated using the polyimide film for graphite sheets set forth above.

The polyimide film can be graphitized at a lower temperature of, for example, less than 2,800° C. (for example, 2,700° C. or less, 2,600° C. or less, 2,500° C. or less, 2.400° C. or less, 2,300° C. or less, 2,200° C. or less, 2,100° C. or less, 2,000° C. or less, or 1,900° C. or less), as another example, about 1,900° C. to about 2,300° C., as a further example, about 1,950° C. to about 2,250° C., as yet another example, about 2,000° C. to about 2,200° C., as yet another example, about 2,050° C. to about 2,150° C., thereby reducing graphite sheet manufacturing costs while improving thermal conductivity of the graphite sheet due to the metal component thereof.

In one embodiment, the graphite sheet (that is, a graphite sheet fabricated using the polyimide film fabricated in the presence of the metal compound) may have higher thermal conductivity than a graphite sheet fabricated using a polyimide film fabricated under the same conditions except for the absence of the metal compound. For example, the graphite sheet may have a thermal conductivity about 1.1 to 1.6 times (for example, 1.1 times, 1.2 times, 1.3 times, 1.4 times, 1.5 times or 1.6 times), for example, about 1.1 to 1.5 times, as another example, about 1.2 to 1.5 times that of a graphite sheet fabricated using a polyimide film free from the metal compound, without being limited thereto.

In one embodiment, the graphite sheet may have a thermal conductivity of about 1,300 W/m·K or more (for example, 1,350 W/m·K or more, 1,400 W/m·K or more, 1,450 W/m·K or more, 1,500 W/m·K or more, 1,550 W/m·K or more, 1,600 W/m·K or more, or 1,650 W/m·K or more). For example, the graphite sheet may have a thermal conductivity of about 1,300 W/m·K to about 2,000 W/m·K, as another example, about 1,300 W/m·K to about 1,800 W/m·K, as a further example, about 1,400 W/m·K to about 1,800 W/m·K, without being limited thereto.

The thickness of the graphite sheet is not particularly restricted. The graphite sheet may have a thickness of, for example, about 15 μm to about 70 μm, as another example, about 15 μm to about 50 μm, as a further example, about 20 μm to about 40 μm, without being limited thereto.

The graphite sheet may be fabricated by any suitable method commonly used in the field of fabricating graphite sheets. For example, the graphite sheet may be fabricated by carbonization and graphitization of the polyimide film.

Here, the carbonization process may be performed at a temperature of, for example, about 1,000° C. to about 1,500° C. for about 1 to 5 hours, without being limited thereto. Through the carbonization process, polymer chains of the polyimide film are thermally decomposed, resulting in formation of a preliminary graphite sheet including a non-crystalline carbon body and/or an amorphous carbon body.

Here, the graphitization process may be performed at a temperature of, for example, less than about 2,800° C. (for example, 2,700° C. or less, 2,600° C. or less, 2,500° C. or less, 2,400° C. or less, 2,300° C. or less, 2,200° C. or less, 2,100° C. or less, 2,000° C. or less, or 1,900° C. or less), as another example, about 1.900° C. to about 2,300° C., as a further example, about 1,950° C. to about 2,250° C., as yet another example, about 2,000° C. to about 2,200° C., as yet another example, about 2,050° C. to about 2,150° C., for about 1 to 10 hours, without being limited thereto. Through the graphitization process, carbon atoms of the non-crystalline carbon body and/or the amorphous carbon body are rearranged, resulting in formation of the graphite sheet.

Next, the present invention will be described in more detail with reference to examples. However, it should be noted that these examples are provided for illustration only and should not be construed in any way as limiting the invention.

EXAMPLE

Example 1

First, 50 g of pyromellitic anhydride as the dianhydride monomer, 50 g of 4,4'-diaminodiphenylether as the diamine monomer, 1 g of boron nitride (3M Company) as the metal compound, and 300 g of dimethylformamide as the organic solvent were mixed together, followed by polymerization, thereby preparing a polyamic acid solution.

Thereafter, 100 g of the prepared polyamic acid solution was mixed with 20 g of acetic anhydride as the dehydrating agent, 3 g of β-picoline as the imidizing agent, and 15 g of dimethylformamide, thereby preparing a polyimide precursor composition having a final viscosity of 300,000 cP.

Thereafter, the prepared polyimide precursor composition was cast to a thickness of 80 μm on an SUS plate (100SA, Sandvik Co., Ltd.) using a doctor blade, followed by drying at 100° C. for 5 minutes, thereby forming a gel film. Then, the gel film was separated from the SUS plate, followed by heat treatment at 300° C. for 5 minutes and at 500° C. for 5 minutes, thereby fabricating a polyimide film having a thickness of 50 μm. Here, the metal compound was present in an amount of 0.05 wt % based on the total weight of the polyimide film.

Examples 2 to 5 and Comparative Example 1

Polyimide films were fabricated in the same manner as in Example 1 except that the amount of the metal compound was changed as listed in Table 1.

Evaluation Example: Measurement of Thermal Conductivity (Unit: W/m·K) of Graphite Sheet Each of the polyimide films fabricated in Examples and Comparative Example was heated to 1,000° C. at a heating rate of 1° C./min under nitrogen gas using an electric furnace, followed by carbonization of the polyimide film by maintaining the temperature for 3 hours. Then, the carbonized polyimide film was heated to a temperature shown in Table 1 at a heating rate of 20° C./min under argon gas, followed by graphitization of the polyimide film by maintaining the temperature for 3 hours, thereby fabricating a graphite sheet.

Then, the in-plane thermal diffusivity of the fabricated graphite sheet was measured by a laser flash method using a thermal diffusivity tester (LFA 467, Netzsch Co.), followed by calculation of the thermal conductivity of the graphite sheet by multiplying the measured value of in-plane thermal diffusivity by density (weight/volume) and specific heat (measured by DSC). Results are shown in Table 1.

TABLE 1

| | Amount of metal compound (wt %) | Graphitization temperature (° C.) | Thermal conductivity of graphite sheet (W/m · K) |
|---|---|---|---|
| Example 1 | 0.05 | 2,300 | 1,550 |
| Example 2 | 0.1 | 2,300 | 1,600 |
| Example 3 | 0.15 | 2,300 | 1,650 |
| Example 4 | 0.2 | 2,300 | 1,630 |
| Example 5 | 0.25 | 2,300 | 1,580 |
| Comparative Example 1 | — | 2,800 | 1,200 |

As can be seen from the results shown in Table 1, despite being graphitized at a lower temperature than the polyimide film of Comparative Example 1 free from the metal compound, the polyimide films of Examples 1 to 5 fabricated in the presence of the metal compound could be fabricated into graphite sheets having better thermal conductivity.

It should be understood that various modifications, changes, alterations, and equivalent embodiments can be made by those skilled in the art without departing from the spirit and scope of the present invention.

What is claimed is:

1. A polyimide film for graphite sheets, the polyimide film being fabricated by imidizing a polyamic acid formed by reaction between a dianhydride monomer and a diamine monomer, wherein the reaction is carried out in the presence of a metal compound and the polyamic acid forms a chelate with metal ions, wherein the diamine monomer comprises 4,4'-diaminodiphenylether, 4,4'-diaminodiphenylmethane, or a combination thereof.

2. The polyimide film according to claim 1, wherein a metal constituting the metal compound comprises nickel, platinum, boron, aluminum, or a combination thereof.

3. The polyimide film according to claim 1, wherein the metal compound comprises a metal oxide, a metal carbide, a metal nitride, or a combination thereof.

4. The polyimide film according to claim 1, wherein the metal compound comprises boron nitride.

5. The polyimide film according to claim 1, wherein the metal compound is present in an amount of about 0.05 wt % to about 1 wt % in the polyimide film based on the total weight of the polyimide film.

6. The polyimide film according to claim 1, wherein the dianhydride monomer comprises pyromellitic dianhydride, 3,3',4,4'-biphenyltetracarboxylic dianhydride, or a combination thereof.

* * * * *